United States Patent [19]
La Porta et al.

[11] Patent Number: 6,085,086
[45] Date of Patent: Jul. 4, 2000

[54] NETWORK-BASED MIGRATING USER AGENT FOR PERSONAL COMMUNICATION SERVICES

[75] Inventors: Thomas F. La Porta, Thornwood, N.Y.; Ramachandran Ramjee, Matawan; Malathi Veeraraghavan, Atlantic Highlands, both of N.J.

[73] Assignee: Lucent Technologies Inc., Murray Hill, N.J.

[21] Appl. No.: 08/884,105

[22] Filed: Jun. 27, 1997

Related U.S. Application Data

[63] Continuation of application No. 08/517,938, Aug. 22, 1995.
[51] Int. Cl.⁷ ........................................ H04Q 7/20
[52] U.S. Cl. ........................... 455/432; 455/422; 455/436
[58] Field of Search ..................... 455/414, 417, 455/422, 432, 433, 436, 461, 466, 556, 557; 370/496, 522

[56] References Cited

U.S. PATENT DOCUMENTS

| | | | |
|---|---|---|---|
| 5,457,680 | 10/1995 | Kamm et al. | 379/59 X |
| 5,473,671 | 12/1995 | Partridge, III | 455/417 |
| 5,548,636 | 8/1996 | Bannister et al. | 455/414 |

OTHER PUBLICATIONS

Adams, R. Gold, B. Schilit, M. Tso and R.Want, "An Infrared Network for Mobile Comput—ers," in Proceedings of the Usenix Mobile and Location–Independent Computing Symposium, Aug. 1993.
Watson, "Application design for wireless computing," Workshop on Mobile Computing Systems and Applications, Dec. 1994.
G.Y. Liu and G.Q.Maguire Jr., A Virtual distributed system architecture for supporting Glo–bal–Distributed mobile computing, Tech. Report, Royal Institute of technology, TRITA–IT R 9501.
M.Litzkow and M. Solomon, "Supporting checkpointing and process migration outside the Unix Kernel," in Usenix Winter Conference, San Francisco, California, 1992.
M.J.Litzkow,M.Livny and M.W.Mutka, "Condor–A Hunter of Idle Workstations," 8th Inter–national Conference on Distributed Computing Systems, Jan Jose, Calif, Jun. 1988.
K.G.Venkatasubramanian, "Preprocessing and Run–Time System Call support for TERN," B.Tech project report, Dept. of Computer Science, IIT Madras, 1992.
T. Ahmad, M. Clary, O. Densmore, S. Gadol, A. Keller and R. Pang, "The DIANA approach to mobile computing," Mobidatajournal, vol. 1, No. 1, Nov. 1994.

*Primary Examiner*—Dwayne D. Bost
*Assistant Examiner*—Nay Maung
*Attorney, Agent, or Firm*—Gibbons, Del Deo, Dolan, Griffinger & Vecchione

[57] ABSTRACT

The present invention is a user process that resides in network nodes to act as an agent for mobile terminals in, for example, PCS environments. The user process handles negotiation and complex signaling functions for the user, thus reducing the amount of signaling traffic that must travel over the valuable air interface. To achieve low call establishment times the user process is migrated as user move. Three embodiment is adapted to enable data sizes which are to be transferred to be optimized, leading to low overhead. This approach also provides flexibility when migrating across heterogeneous environments. A second alternative embodiment may be advantageously utilized when a program is compute intensive and asynchronous migration is essential. The third embodiment provides high reliability in the form of checkpointing, but incurs a high migration delay and has high memory requirement for network processors.

29 Claims, 7 Drawing Sheets

NETWORK-BASED MIGRATING USER AGENT FOR PERSONAL COMMUNICATION SERVICES

RELATED APPLICATION

This application i a continuation of application Ser. No. 08/517,938 filed Aug. 22,1995.

The present patent application is related to U.S. patent application Ser. No. 08/324,427, entitled Method And System For Distributed Control In Wireless Cellular And Personal Communication Systems, having a filing date of Oct. 17, 1994, that application having a common assignee and one or more common inventors and being incorporated herein by reference.

FIELD OF THE INVENTION

The present invention relates to a network for providing Personal Communication Services for mobile users, and more particularly to network based agents that represent mobile users and perform complex signaling functions on behalf of the mobile users.

BACKGROUND OF THE INVENTION

It is expected that advanced Personal Communications Services (PCS) will provide users with multimedia communication of differing quality on a variety of mobile terminals. These terminals will have varying capabilities. As such, complex negotiation and compatibility checking mechanisms may be required. This may result in several messages being exchanged with the end devices before communication paths to carry user information are established.

In most large scale wireless systems which provide service guarantees, signaling is performed over shared channels. Therefore, congestion on signaling channels can seriously degrade the performance of many users on the system. For this reason, it is beneficial to avoid complex signaling procedures which will occupy valuable air resources. This is contrary to what is required to provide advanced services in a PCS environment as described above.

Accordingly, it has been recognized that there is a need to introduce "indirect" interaction between clients and servers when two entities are directly connected to drastically different communication media, for example the wired and wireless media. This indirection can be accomplished by the introduction of an intermediary server through which the wireless client communicates with the fixed network. The limited processing capability of the mobile (computer) terminal is another factor which motivates the use of an intermediary server. The intermediary server, which resides in the fixed network, has access to high bandwidth links and large computational resources. These characteristics can be exploited by carefully separating functionality between the server and the mobile terminal. When this intermediary server is assigned to a particular mobile user, and performs actions on behalf of that mobile user, it is termed a "User Agent".

The need for an agent inside a fixed network, acting on behalf of a mobile user, has been proposed in the prior art. In "Efficient Mobility Management Support for Wireless Data Services", G. Y. Liu, G. Q. Maguire. Jr., to appear at the proc. of 45th IEEE Vehicular Technology Conference, Chicago, Ill., Jul. 1995, for example, two types of agents were proposed, the Personal agent (P-agent), which is a representative of the user in the network, and a Mobile Floating agent (MF-agent). The P-agent contains all the service logic and service data related to the user, and controls the communication sessions. The MF-agent is assigned by the P-agent at remote locations. The MF-agent becomes the acting P-agent and provides services to the user.

Another example of network agents is found in the ParcTab network "An Infrared Network for Mobile Computers," N. Adams, R. Gold, B. Schilit, M. Tso and R. Want, in Proceedings of the Usenix Mobile and Location-Independent Computing Symposium, August 1993. In ParcTab, the agent is responsible for delivering requests to its corresponding mobile user and tracking the location of the mobile as it moves from cell to cell. Thus, the agent can be seen as a Mobile Support Router of the Mobile IP scheme which manages the routing for a specific mobile terminal. The framework developed in ParcTab is used in Watson, "Application design for wireless computing," Workshop on Mobile Computing Systems and Applications, December 1994, where the network proxy process provides connections, and acts as an application programmer interface. Here, applications always communicate with the mobile terminal through the proxy.

A distinction can be made among the agents depending on whether they affect the control information or the data sent/received by the mobile. In ParcTab, for example, the agent processes the data flowing to the mobile. Other so-called agents in the prior art also perform multiplexing and demultiplexing operations on data flowing to/from a mobile user, all of which data processing results in a large performance penalty.

The issue of agent mobility is an important one which has usually been resolved according to the needs of a particular application. Many of the systems using the "agent" concept are able to assume a fixed agent because of the application involved. For example, the ParcTab network is an infrared network with room-sized cells designed for indoor operation and hence the agent is assigned to a well known location. In order to support signaling over a wide-area, however, a fixed agent would lead to large setup delays which are unacceptable in most cases.

Other applications in the prior art have considered incorporating mobility into the user agent. In "Adaptive Remote Paging for Mobile Computers", Schilit and D. Duchamp, Tech Report TR CUCS-004-9 1, Dept. of Computer Science, Columbia University, data pages from a mobile terminal are remotely stored in the network to facilitate the use of the main memory on machines inside the fixed network. Pages are migrated as the users move so that the loading time of the pages is kept low. In "A Virtual Distributed System Architecture for Supporting Global-Distributed Mobile Computing, G. Y. Liu and G. Q. Maguire Jr., Tech. Report, Royal Institute of technology, TRITA-IT R 9501, a prediction algorithm is incorporated to track the mobile users. Mobile floating agents are instantiated at locations close to the mobile users to ensure that they may access resources at their new locations.

In order to improve upon the utilization of agents in the prior art, it is therefore an object of the present invention to provide a mobile user agent and associated user process that manages control information only and is not simply instantiated at the new location but also carries all its state information with it as it migrates between machines.

SUMMARY OF THE INVENTION

The present invention is a user process that resides in network nodes to act as an agent for the mobile terminals in PCS environments. The user process handles all negotiation and complex signaling functions for the user, thus reducing the amount of signaling traffic that must travel over the valuable air interface. The user process mimics the mobile terminal. It knows all of the capabilities of the mobile terminal and its applications, and it knows the current state of the terminal. Any complex signaling procedures are terminated on the user process which performs the negotiation tasks on behalf of the mobile terminal. The user process communicates with the mobile terminal using simple messages which resemble communication primitives. To achieve low call establishment times the user process is migrated as users move.

Three embodiments of mechanisms for migrating the user process are disclosed. The NAIVE approach enables the amount of data size to be transferred to be optimized, leading to low overhead. This approach also provides flexibility when migrating across heterogeneous environments. A second alternative, termed the TERN approach, is promising for cases when the program is compute intensive and asynchronous migration is essential. The last approach considered, Condor, provides high reliability in the form of checkpointing, but incurs a high migration delay and has high memory requirements for the network processors.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

The present invention is a network-based agent that represents mobile users in a Personal Communication Services (PCS) environment. The agent, referred to as a user process, performs complex signaling functions related to call processing on behalf of an associated mobile terminal, thus reducing the amount of signaling traffic that must travel over the valuable air interface. To achieve low call establishment delays, the user process migrates as the mobile terminal moves.

Figure 1:
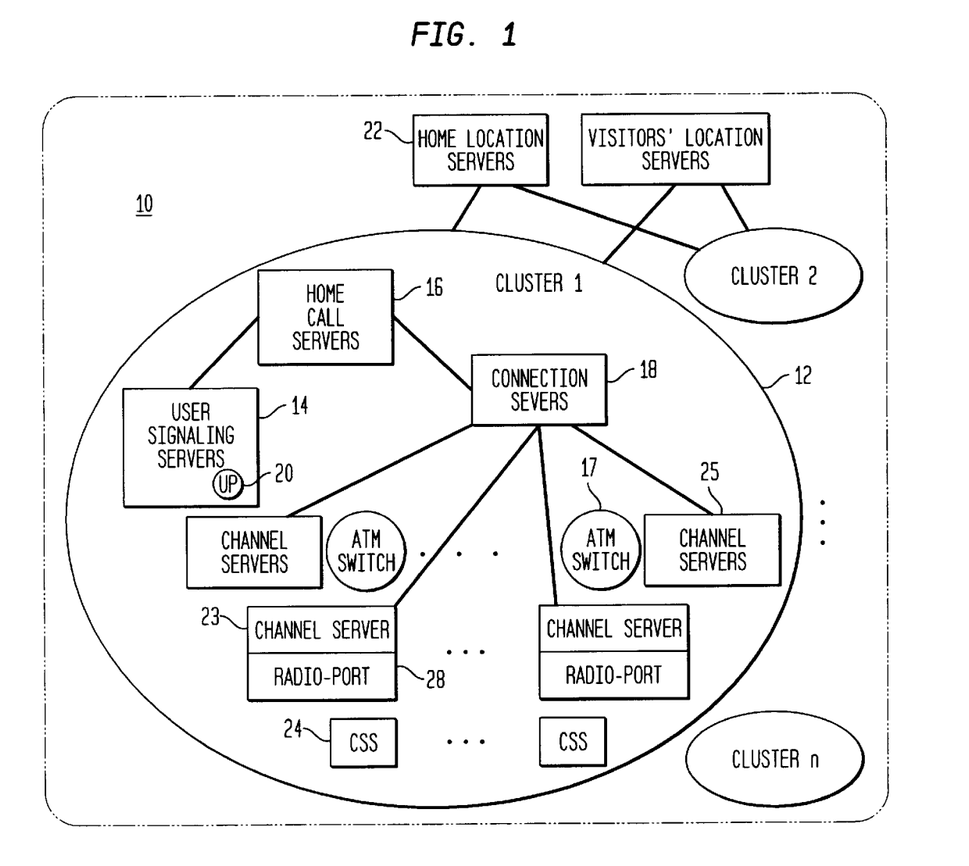
FIG. 1 shows one preferred embodiment of a network within which the present invention migrating user agent is utilized.

As described above, the user agent operates within a PCS environment. Referring to FIG. 1, a simplified configuration of an exemplary PCS network 10 is shown. Each network 10, as shown, may be divided into regions referred to as clusters 12. Within each cluster 12 are User Signaling Servers 14, Call Servers 16 and Connection Servers 18. The User Signaling Servers 14 house multiple user processes 20 on behalf of mobile terminals operating within the cluster. Within a cluster 12, a mobile station 24, also referred to herein as a mobile terminal, is assigned to a User Signaling Server 14. The user process communicates with the mobile terminal through a base station 23 currently serving the mobile terminal, wherein the base station includes, for example, a channel server and radio port 28 to wirelessly communicate with the mobile. The Call Server 16 maintains the network state of the call and the Connection Servers 18 are responsible for establishing the communication path over which user information (voice or data) is transmitted. Coupled between the connection servers 18 and the base station 23 are a plurality of channel servers 25 and switches 17, for example, ATM switches, each of which is also involved in establishing the communication path as would be understood by one skilled in the art.

Each network contains multiple Location Servers 22 which are responsible for tracking the location of a mobile terminal within a network. The Location Servers 22 are not associated with a cluster, but track the movement of mobile terminals across cluster boundaries. When a mobile terminal is powered on it registers with a Location Server. For a more detailed description of a cluster-based network, see related U.S. patent application Ser. No. 08/324,427, entitled Method And System For Distributed Control In Wireless Cellular And Personal Communication Systems, having a filing date of Oct. 17, 1994, and being incorporated herein by reference.

Figure 2:
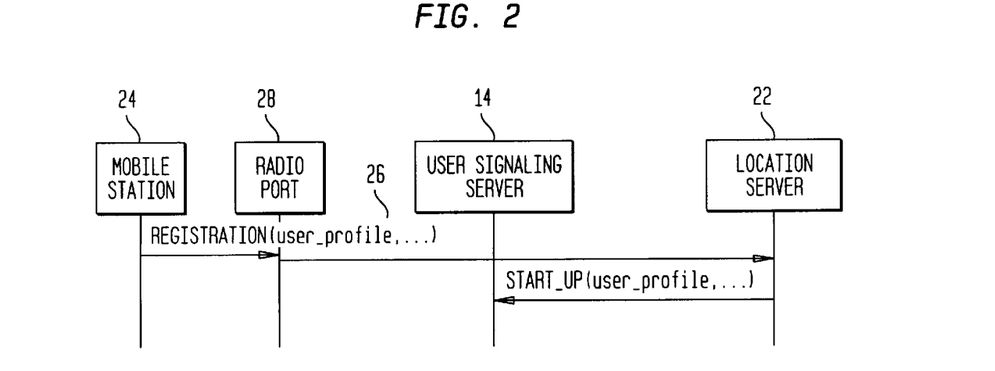
FIG. 2 shows the power-up registration procedure when a mobile terminal is first powered.

Referring to FIG. 2, the registration procedure of a mobile terminal 24 is illustrated. This registration includes a profile 26 provided by the mobile terminal. This profile 26 contains compatibility information of the mobile terminal 24, which applications are running, and any other user specific information that is required to create the user process. One example of User Profile data is the MOB_TERM parameter of IS-95 which indicates whether the cellular user is willing to accept incoming calls. The Location Server 22 is responsible for recording the current cluster of the mobile terminal 24, and instructing a User Signaling Server 14 to instantiate a user process on behalf of the mobile terminal. This user process is loaded with the user profile so that it can act on behalf of the user.

An analogous flow for power down registration results in the location server instructing the User Signaling Server to terminate the execution of the user process.

Figure 3:
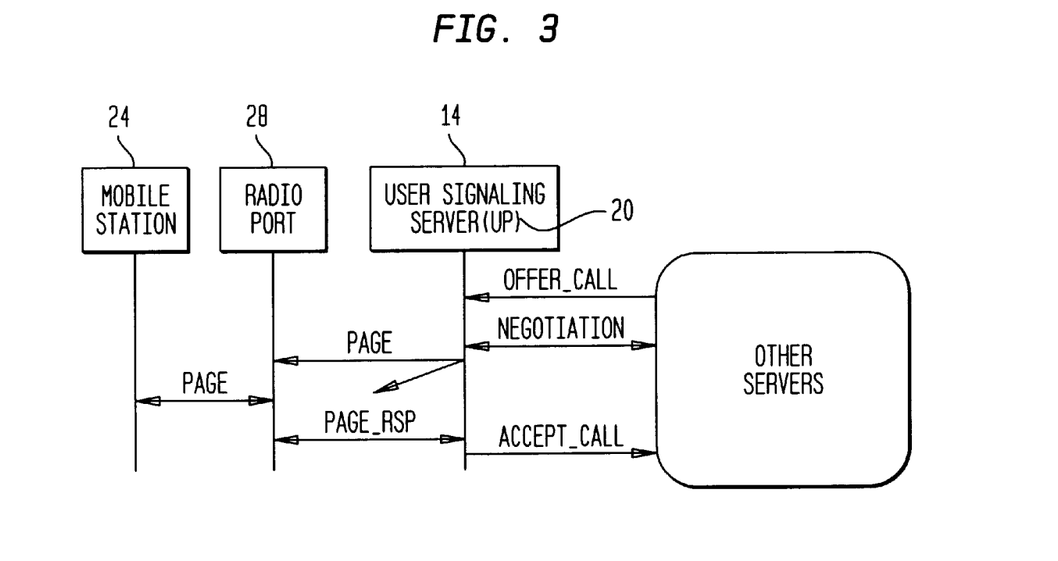
FIG. 3 shows the steps taken by the present invention user process during an incoming call.

To illustrate the functionality of the user process, the scenarios for call setup are next described. When a call is placed to a mobile terminal 24, as shown in FIG. 3, the network offers the call to the user process 20 representing the called mobile terminal. If there is any negotiation or compatibility checking that must take place between the called mobile terminal 24 and the calling party or the network, it occurs at this point of the call establishment through further interaction with the user process. If the user process 20 decides to accept the call, it pages its mobile terminal 24 to determine its exact location, for example, a specific radio-port 28 within a cluster. Thus the mobile is tracked to the granularity of a cluster when it is idle and it: exact location determined at call setup time, thereby optimizing on the trade-off between the number of registrations and the amount of paging required.

Figure 4:
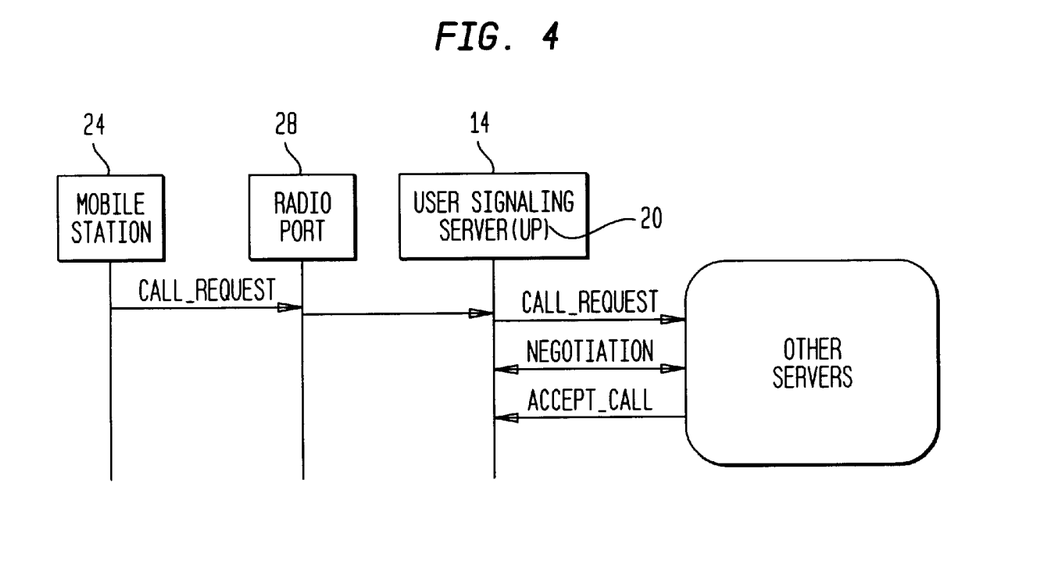
FIG. 4 shows the steps taken by the present invention user process during an outgoing call.

When the mobile terminal 24 wishes to place a call, as shown in FIG. 4, it signals to its user process 20 and requests a call of a certain type. The user process 20 maps the call type into specific services and applications that are executing on the mobile terminal, and generates a call request. If there is any negotiation that must take place between the mobile terminal and the called party, it is done through interaction with the user process 20.

As has been briefly described, the present invention addresses the challenges of user process mobility management by enabling the user process to essentially migrate along with the mobile user. When a mobile terminal 24 crosses cluster boundaries, it is assigned to a new User Signaling Server 15 by the Location Server 22. According to the present invention, the user process migrates from its current location to the new User Signaling Server 15. The process is required to migrate, and not simply be re-instantiated, because it contains the current state of the user which must be preserved. These parameters include, for example, the identifiers of any calls in which the mobile terminal is currently active. In addition, we do not wish to repeatedly download the user profile information over the air interface. Besides creating unnecessary load on the air interface, this could pose security risks for the user.

Because a migration between clusters is a managed event, we do not require transparent process migration which has been the aim of many previous process migration efforts. In the instant case, the process itself requires that it be executing at a new location. Therefore, the process is aware it is migrating, can plan for the migration, and assist in the migration. Because a specific process is migrating and not an arbitrary one, use can be made of information specific to the process being migrated. For example, the user process which has to migrate does not have any open file descriptors and does not use any signals. Thus, the present invention mechanisms need not have special purpose signal handling or file handling routines.

Migration, in the instant case, however, is complicated by the fact that communication logic is strongly coupled with the processing logic of the application and thus, means must be provided for re-establishing the communication channels of the process after it has migrated. In "The DIANA approach to mobile computing," T. Ahmad, M. Clary, O. Densmore, S. Gadol, A. Keller and R. Pang, Mobidata journal, Vol. 1, No. 1, November 1994, a new application architecture is proposed which de-couples the communication logic from the processing logic of the application. This feature is particularly appealing as the migration mechanism will have to deal only with migrating the processing logic-specific components, not the communication logic.

Figure 5:
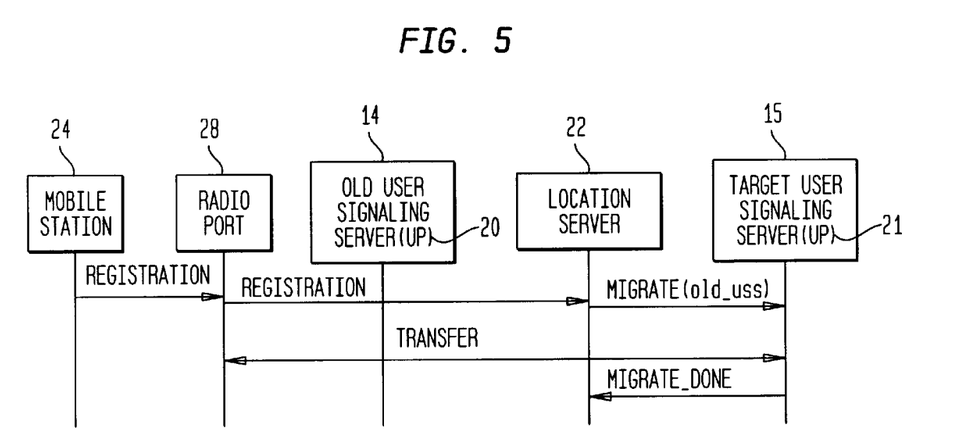
FIG. 5 shows the steps taken by the present invention user process during a cluster change.

The various steps involved in the migration process are illustrated in FIG. 5. The User Signaling Servers (old 14 and target 15) reside on two different nodes in different clusters. When a mobile station 24 changes clusters, it generates a REGISTRATION message to its Location Server 22. The Location Server 22 signals to the target User Signaling Server 15 to migrate the process (MIGRATE). The target User Signaling Server communicates with the old User Signaling Server 14 which transfers all relevant information about the user process 20 to the target User Signaling Server 15, for example, all data and stack pages, the state of the user, and all user profile information. The old User Signaling Server 14 also maintains a stub process in place of the user process 20 to buffer any messages arriving for the user process while migration is underway. The new user process 21 requests any buffered messages from the stub process residing on the old User Signaling Server 14 and resumes its normal processing. The stub process exits after an idle time-out period.

Two major benefits are derived by maintaining and migrating a user process in the network: less air signaling traffic and lower call establishment times. The benefit of reducing the amount of signaling traffic generated over the shared air signaling channel results from maintaining a user process in the network. As seen in FIGS. 3 and 4, few messages are required between the mobile terminal 24 and the user process 20 to establish a call. Instead, the bulk of the signaling message exchange occurs between the user process and other users or servers in the network. In addition, if the user process does not wish to accept a call, no paging of the user terminal is required. This reduces the amount of paging traffic required in the network, which is a known bottleneck. The benefit of lowering call establishment times results from the fact that the user process is located near the mobile terminal.

Another approach is to anchor the user process in the user signaling server in which it was created during power-up registration. As the user moves, radio ports can be updated with the location of the anchored user process. This allows the new radio port of the mobile terminal to send call requests or other messages generated from the mobile to the appropriate user process. Similarly, when the mobile changes clusters that are used for mobile tracking, the user process needs to be updated with the new paging area data allowing it to page the mobile for incoming call delivery. The disadvantage is that since the mobile terminal may be far removed from the user signaling server where its user agent (UP) is located, signaling message transit times and hence call establishment times ay increase.

Figure 9:
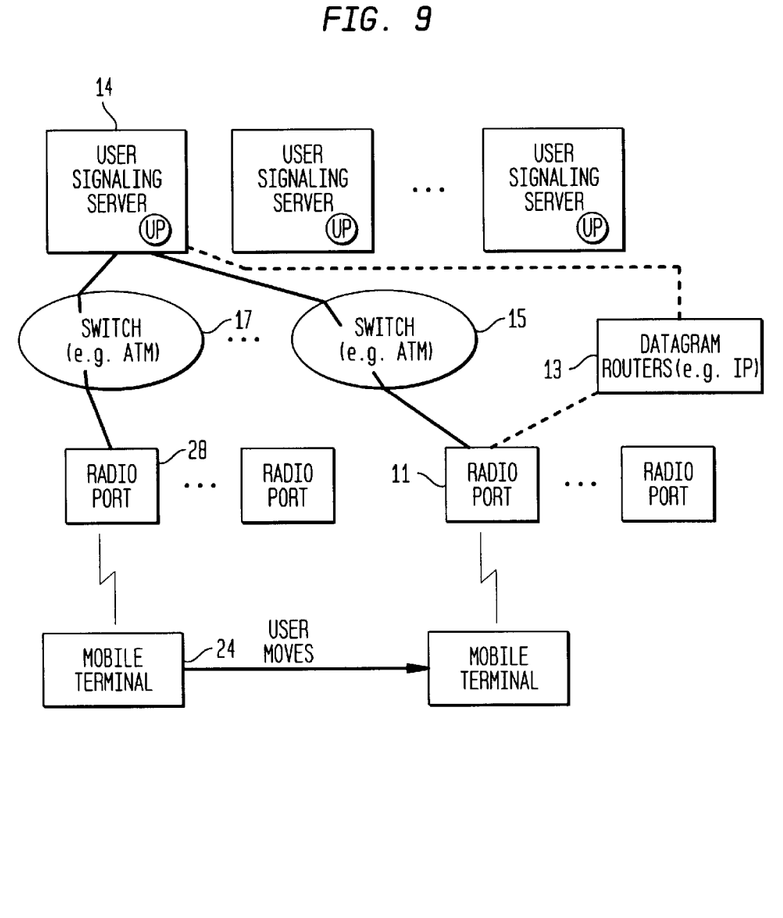
FIG. 9 shows two schemes for enabling radio ports within said network to communicate with any user signaling server.

FIG. 9 illustrates two schemes that can be used to allow a radio port 28 to communicate with any user signaling server 14. The first scheme is via connectionless datagram routers 13. In this case, when mobile terminal 24 moves from a first radio port to a new radio port 11, the new radio port, and possibly other radio ports within the cluster are updated with a datagram address of the new user signaling server.

In the second scheme, connection-oriented signaling links, e.g., Asynchronous Transfer Mode virtual channel connection 15, 17 may be used from radio ports to user signaling servers. These signaling links can be pre-established or established as the users move. The advantage to the connectionless approach is that radio port updates are simpler than connection setup procedures. On the other hand, connection oriented signaling is typically faster than signaling through datagram routers.

In any event, when analyzing migration of the user process, the associated overhead costs were analyzed to provide justification for possible implementation of the migrating user process. When considering signaling load, we are most concerned about signaling messages that must travel outside of a localized area which may congest long distance, or cross-network, signaling links.

The proposal to migrate the user process as a user changes clusters indicates that the only overhead incurred by migrating the user process is the migration procedure itself. As can be seen in FIGS. 2–4, there is no extra signaling overhead associated with registration procedures or call control resulting from the fact that the user process migrates.

The flow for changing clusters as shown in FIG. 5 indicates that the MIGRATE and MIGRATE_DONE commands may travel on long distance signaling links as the location servers are located independently from the cluster in which the mobile users are located. The TRANSFER command in FIG. 5 requires a message exchange between two neighboring clusters. Therefore, the long distance signaling overhead associated with migrating the user process is limited to the MIGRATE/MIGRATE_DONE message exchange between the user signaling servers and the location servers. These messages total to approximately 150 bytes.

To estimate the overhead incurred in migration, we use common assumptions for characteristics of a PCS network, summarized in Table 1. Assuming that the direction of the movement of the terminals is uniformly

TABLE 1

Model Parameters

| Parameter | Value |
| --- | --- |
| Total number of mobile terminals | 2.87 million |
| Average call origination/arrival rate | 1.4/hour/terminal |
| Mean Density of Terminals, $\rho$ | 390/sq. km |
| Average speed of a mobile terminal, v | 5.6 km/hr |
| Cluster (square) edge length, L | 30.3 km |
| Clusters per network | 128 | distributed over $[0, 2\pi]$, and using a fluid flow mobility model, for example, "Influence of mobile station on the performance of a Radio Mobile cellular network," R. Thomas, H. Gilbert and G. Mazziotto, Proc. of 3rd Nordic Sem., paper 9.4, Copenhagen, Denmark, September 1988, the rate of mobiles crossing a cluster boundary is $$R = \rho v L/\pi$$

Given the values of Table 1, a single cluster experiences 5.85 boundary crossings per second. Accounting for 128 clusters in the network, our proposal incurs 900 Kbps long distance signaling overhead network-wide. This translates to about 7 Kbps at each cluster. Thus, it is believed that the overhead incurred in migrating the user process to enable faster connection setup is a worthwhile trade-off.

There are several considerations when choosing schemes for process migration. First, it is required that the delay in migrating a process from one node to another be as small as possible. This is because the user process is not processing any messages while it is migrating, and thus the time taken to migrate will manifest in the call setup delay if messages happen to get queued at the old location during migration. On the other hand, delay in initiation of migration is not a major concern because the user process remains active while waiting for the migration to be initiated. Flexibility in operating environment is another concern, and thus rules out some schemes which require a special purpose operating system.

With these requirements in mind, three different embodiments are considered for implementation of the present invention, each of which offer the required flexibility. A performance comparison is then made in terms of the speed of migration for different loads (which in this case is the data size of the migrant process). In each case, it is assumed that all nodes have the executable code for the user process resident, as this will reduce the amount of information that must be transferred between the source and destination nodes, and will in turn reduce the delay in migration.

The approaches considered, the Condor approach, the TERN approach, and the NAIVE approach, are flexible in terms of operating environment as they do not require access to the internals of the operating system. The Condor approach can be run entirely at the user level. The only requirement for the TERN approach is that it must be possible to access the kernel virtual memory of the system. The NAIVE approach requires the process to manage the migration itself by saving its variables and re-reading them upon migration.

Most process migration schemes do not handle system calls relating to communication, for example the socket system call, since there is the problem of hidden state in the form of transit messages. In the instant case, we only require that all transit messages be delivered in sequence to the process after its migration, and are not concerned as to whether the message intended to the user process in machine A was actually delivered to the user process after it had migrated to machine B. The problem of redirection of messages is similar to the one faced by the mobile IP mechanisms, in which one needs to ensure that packets reach the mobile station at its new address as the mobile station moves. In our case, we create a temporary stub which stores any arriving messages during the migration phase, and forwards them to the migrated process after it has stabilized.

The first preferred embodiment of the user process migration scheme is based on the Condor migration system, M. Litzkow and M. Solomon, "Supporting checkpointing and process migration outside the Unix Kernel," in Usenix Winter Conference, San Francisco, Calif., 1992 and M. J. Litzkow, M. Livny and M. W. Mutka, "Condor—A Hunter of Idle Workstations," 8th Inter- national Conference on Distributed Computing Systems, Jan Jose, Calif., June 1988. The Condor system supports process migration entirely at the user level and has been implemented on UNIX platforms. At the core of the technique is the notion of checkpointing; the process is checkpointed at one machine and resumed at another machine. As far as the process is concerned, the migration appears to be the arrival of a signal and a setjmp call, which occurs at the original machine, and a return from a longjmp call which occurs at the new machine.

Figure 7:
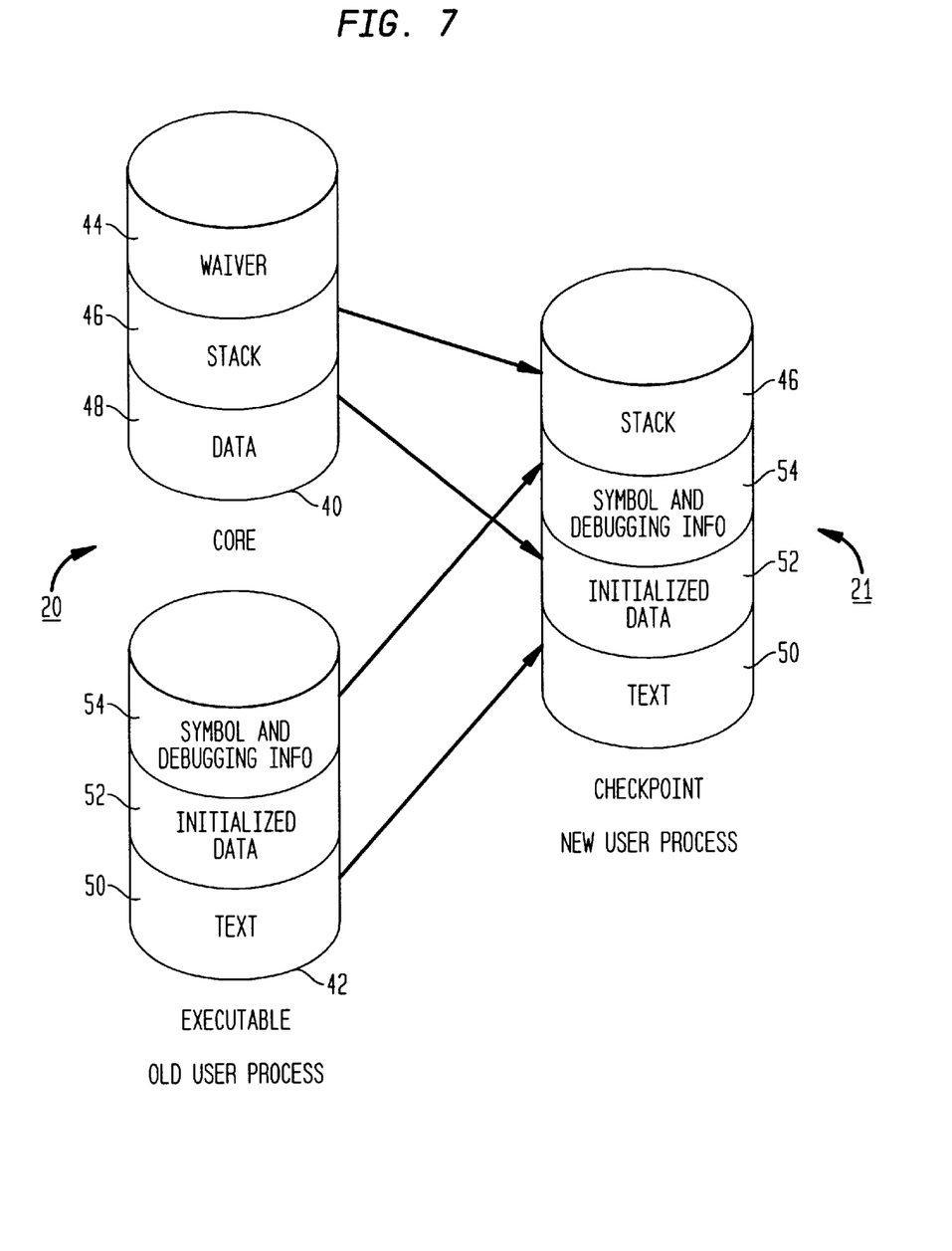
FIG. 7 shows an exemplary embodiment of a first preferred migration scheme.

The basic idea behind the Condor approach is to dump the core of memory of an initial user process and then re-create the process at the new destination. In other words, everything in memory is transferred and then the user process is started. Referring to FIG. 7, there is shown an exemplary embodiment of a user process 20 according to the present invention. As shown, the user process 20 includes two main portions, a core 40 and executable 42. The core 40 includes a user area 44, stack 46 and data storage 48. The executable 42 includes text 50, initialized data 52 and symbol and debugging information 54. As mentioned previously, the Condor approach essentially checkpoints the user process from one machine to another. The new user process 21 which is checkpointed at the new machine (or user signaling server) includes the stack 46, symbol and debugging information 54, initialized data 52 and text 50.

Figure 7A:
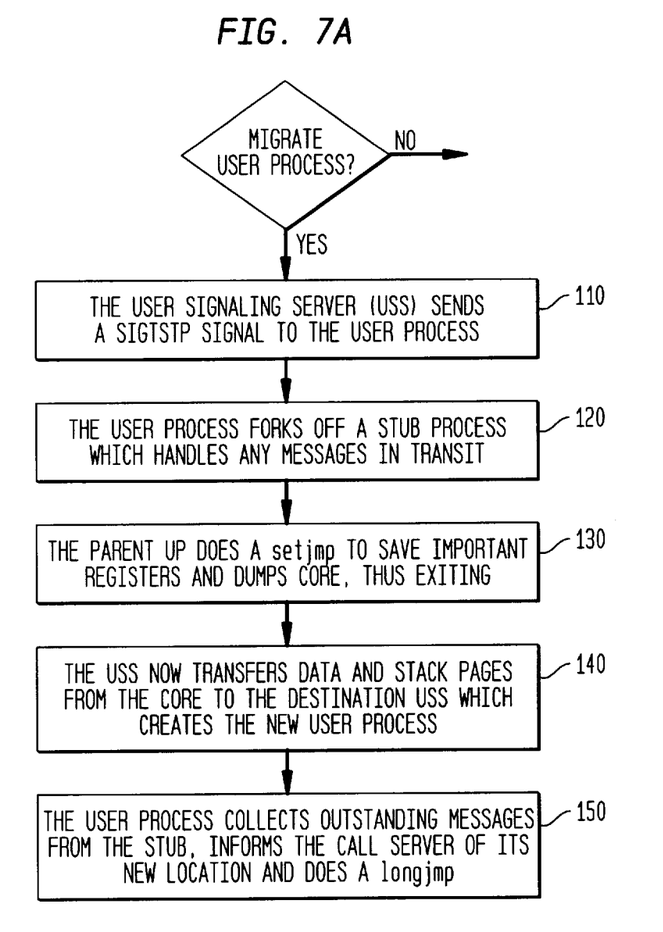
FIG. 7A shows a flow diagram associated with the migration scheme of FIG. 7.

The steps involved in implementation of the Condor approach to migrate the user process after the mobile station changes clusters are summarized in the flow diagram of FIG. 7A and are as follows:

The User Signaling Server (USS) sends a SIGTSTP signal to the user process. (110)

2. The user process forks off a child stub process that buffers the messages sent to the original user process. (120)

3. The parent user process now executes a setmp to save important registers (PC, SP, etc.) in a buffer and dumps a core, thus exiting. (130)

4. The USS transfers information (data and stack pages) from the core to the target USS. (140)

5. The target USS creates the new user process using the text segment from the executable present in its node, and the stack and data segments received from the old USS. (140)

6. The user process establishes its communication channels.

7. The user process sends a READY message to the stub process and receives any outstanding messages that have been buffered. (150)

8. The user process executes a longimp to continue execution from where it left off. (150)

Note that all these steps can be achieved at the user level. The new user process created is a checkpoint file and can be reviewed later in the case of a machine or network crash. Since Condor is a general purpose mechanism, migration can be initiated asynchronously, that is, the process can be stopped at any point in the code and migrated, thus ensuring a quick response to a migration call.

A second preferred embodiment of the present invention migration scheme is based on TERN, a transparent process migration mechanism described in M. Kannan, "TERN—migration mechanism and the communication layer," B.Tech project report, Dept. of Computer Science, IIT Madras, 1992 and K. G. Venkatasubramanian, "Preprocessing and Run-Time System Call support for TERN," B.Tech project report, Dept. of Computer Science, IIT Madras, 1992. As opposed to Condor, a checkpoint file is not created in this scheme. The mechanism requires information, such as process data and stack sizes, of an executing process. This requires access to kernel virtual memory, which is usually restricted to the general user. This access requirement is not a concern since the User Signaling Servers are resident in a network node, and are thus in a curtailed service environment.

Figure 8:
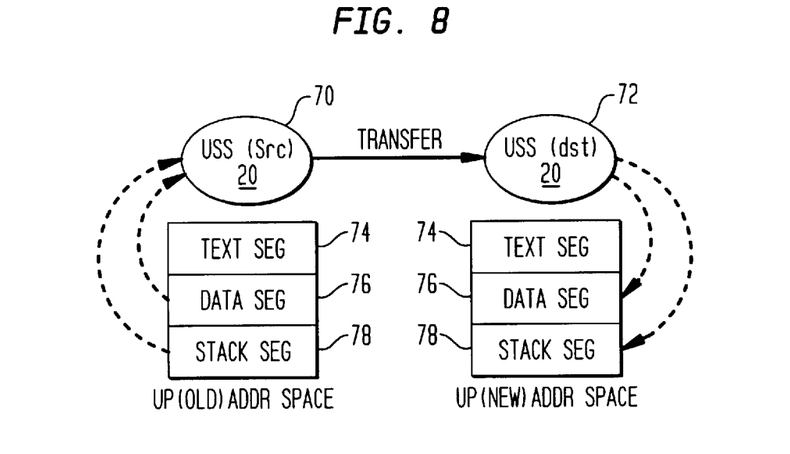
FIG. 8 shows an exemplary embodiment of a second preferred migration scheme.

Referring to FIG. 8, an exemplary implementation of the migration approach is shown. As can be seen, a user process 20 is contained at a source node 70 and a destination node 72. The address space of each user process includes a text segment 74, a data segment 76 and a stack segment 78. Under TERN, the stack and data pages 76, 78 are directly copied from the virtual address space of the user process. The basic idea behind TERN is to start up a process at a destination and then copy stack and data pages onto the appropriate virtual address space. Thus a core dump is not required, resulting in greater efficiency as will be seen. TERN, like Condor, is a general purpose mechanism, and thus migration can be initiated asynchronously resulting in a quick response to a migration call.

Figure 8A:
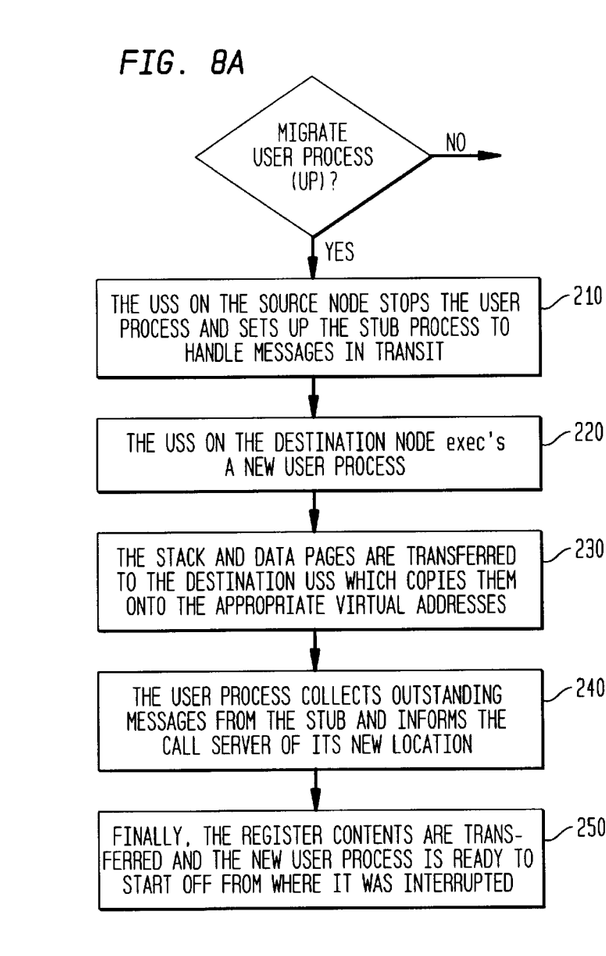
FIG. 8A shows a flow diagram associated with the migration scheme of FIG. 8.

The steps involved in migrating a user process using TERN are summarized in the flow diagram of FIG. 8A and are as follows:

1. The User Signaling Server (USS) on the source node stops the user process and transfers the arguments and the environment of the process to the target USS. (210)
2. The USS sets up a stub process to buffer any incoming messages. (210)
3. The USS on the target node exec's a new user process with the arguments and environment obtained from the source USS. (220)
4. The USS on the source node calculates the data and stack sizes of the migrant process and transfers this information to the target USS which ensures that the new user process expands its stack and data pages suitably. (220)
5. The data pages are transferred and written onto the virtual address space of the user process executing on the target User Signaling Server. (230)
6. The stack pages are transferred and written. (230)
7. The user process establishes its communication channels.
8. The user process sends a READY message to the stub process and receives any outstanding messages that have been buffered. (240)
9. The register contents are transferred and the new user process restarts from where it was interrupted. (250)

Figure 10:
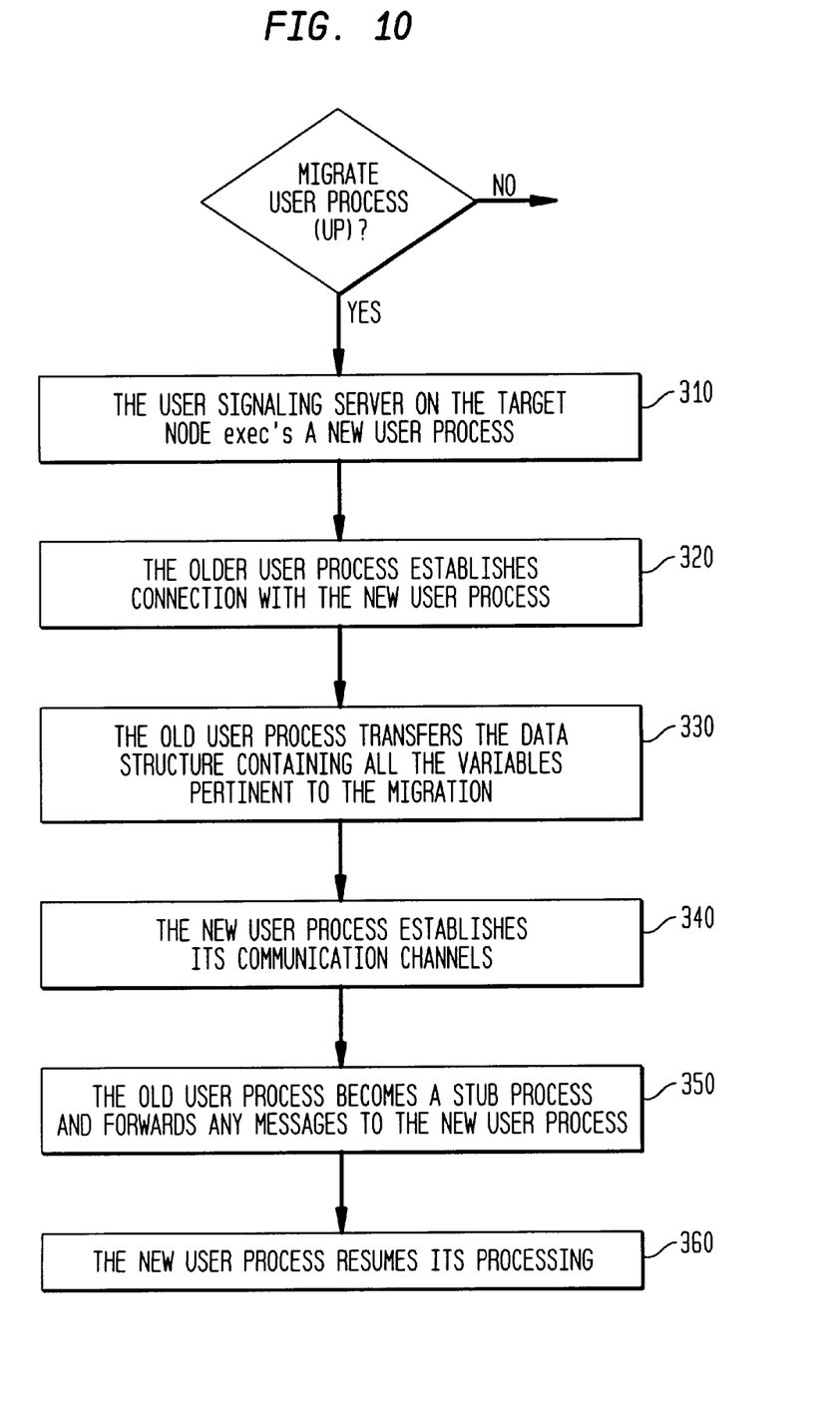
FIG. 10 shows a flow diagram associated with a third preferred migration scheme.

As mentioned earlier, one main difference between the present requirement for process migration and other process migration mechanism requirements is that it is known, a priori, which process is going to migrate. Thus, we need not have a general purpose migration mechanism and can resort to transferring only the necessary logical variables in order to increase efficiency. This type approach is presented as the third preferred embodiment for the present invention user process migration scheme, wherein it is termed the NAIVE approach. The steps involved are summarized in FIG. 10 and are as follows:

1. The User Signaling Server on the target node exec's a new user process. (310)
2. The old user process establishes connection with the new user process. (320)
3. The old user process transfers the data structure containing all the variables pertinent to the migration. (330)
4. The new user process establishes its communication channels. (340)
5. The old user process becomes a stub process and forwards any messages to the new user process. (350)
6. The new user process resumes its processing. (360)

Here, the variables crucial to the migration are placed in a suitable data structure so that modifying the user process code will have minimum ramifications to the migration mechanism. Examples of pertinent variables include those parameter having to do with call connection and the state of the mobile. Relevant data pertaining to call connection may include, for example, type of connection, number of users, identification of the users, call type, call forwarding and whether or not the mobile station will accept incoming calls. Information pertaining to the state of the mobile may include, for example, terminal identities, what applications are running, e.g., Xserver running, compatibility checking, e.g., video card, etc.

Note that there are two major differences between the NAIVE approach and the TERN and Condor approaches. In the NAIVE approach, the migration procedures are closely tied to the program logic, therefore in the NAIVE approach the user process can be selective of what information will be transferred, which significantly increases the efficiency of the migration procedure. For example, if a mobile station is idle, then much less information need be transferred than if the mobile is actively engaged. In this instance the user process makes decisions as part of the program logic and adjusts the volume of data that is necessary to be transferred. In the TERN and Condor approaches, on the other hand, the migration procedures are independent of the program logic. Also, in the NAIVE approach, the migration may only be initiated at certain points in the code, i.e., when all of the crucial variables have been stabilized and saved, whereas in the TERN and Condor approaches the migration process may begin asynchronously.

Table 2 presents a summary of the three process migration mechanisms with relation to characteristics

TABLE 2

Process Migration Mechanism Summary

| Method | Independent of program logic | Works across heterogeneous platforms | Asynchronous initiation | Optimizes data to be migrated |
| --- | --- | --- | --- | --- |
| NAIVE | N | Y | N | Y |
| TERN | Y | N | Y | N |
| CONDOR | Y | N | Y | N | that are generally considered to be attractive in process migration mechanisms. The NAIVE approach has two possible disadvantages. First, it is not independent of program logic. It was found, however, that this did not overly complicate our implementation. In addition, it is this dependence that allows us to optimize the amount of data that must be transferred during the migration. The second possible disadvantage is that the process migration may not start asynchronously. As stated previously, this does not concern our application because the user process is active while waiting for migration to commence; we are more concerned with the time for migration to conclude once it has begun.

The TERN and Condor approaches have two possible disadvantages. First, the amount of data that must be transferred cannot be optimized. Also, neither approach will work across heterogeneous systems. The Condor approach has one additional disadvantage. It requires a large amount of memory on the User Signaling Server to accommodate the core dump during process migration.

The per-byte cost of these schemes and the performance related issues of the migration itself can now be examined. As discussed earlier, one of the most important requirements is to incur a low delay in migrating a process. Thus, the time taken to migrate for each of these three schemes was measured. Clearly, this time depends on the amount of information being transferred between the User Signaling Servers.

The three schemes discussed were implemented on UNIX platforms. A typical data point was obtained by migrating a process between two machines located on different ethernet local area networks, and averaging the time taken to migrate the process. The data size was varied from 1 Kbyte to 1 Mbyte, and the time to migrate for each of the three approaches was measured. All three schemes varied linearly with data size as expected. However, the per-byte overhead differed in each of the approaches and was critical to the overall system performance.

Figure 6:
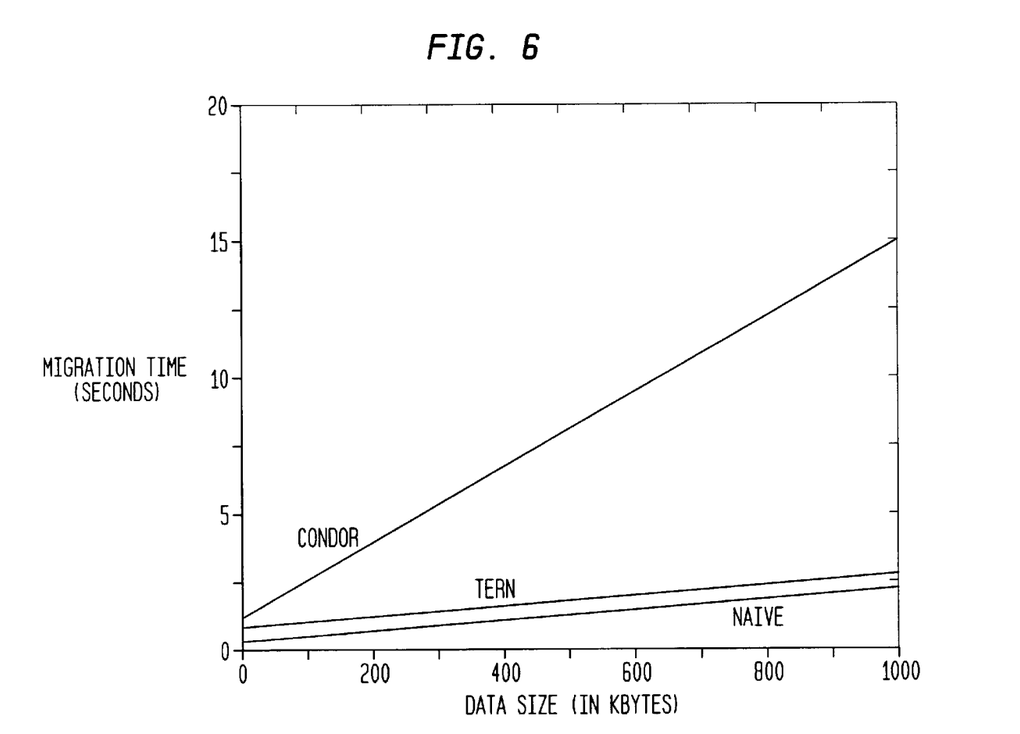
FIG. 6 shows performance data for three preferred embodiments of the present invention migrating user process.

Referring to FIG. 6, it can clearly be seen that the TERN and NAIVE approaches have low per-byte cost and scale well with increase in data size. The TERN approach performs better than Condor because it is much cheaper to write directly onto the virtual address space of a process rather than read/write onto the executable file.

A key to the performance of the actual system is the data size of the user process and how much of it is crucial to the migration. Current implementation of the user process has a data size of about 72 Kbytes which must be migrated when using the TERN approach. This takes, on average, 750 milliseconds to migrate on the UNIX platform. In the case of the NAIVE approach, we were able to optimize the size of the data to be migrated to between 45 and 100 bytes depending on the size of the profile and whether the user was active in a call or not. This takes, on average, 150 milliseconds to migrate. This illustrates the advantage of being able to optimize the amount of data to be transferred when using the NAIVE approach.

This difference is due to the fact that the user process consists of several protocol layers and libraries. When using the NAIVE approach, the user process migrates only when it is in a "stable" state; that is the state of the lower layer data elements are inconsequential as far as migration is concerned. While this may cause a delay in the initiation of migration, as previously stated, this does not concern our application.

The TERN approach is an attractive alternative if the user process evolves into a more processing intensive entity than in the present system. For example, in systems in which a user agent processes data being exchanged with the end device, it may not be possible to cleanly separate a small set of variables to be migrated. The Condor approach, on the other hand, is attractive only when checkpointing for reliability or other reasons is required.

Three embodiments of possible mechanisms for migrating the user process have been presented. The NAIVE approach appears to be the most promising; in that tire amount of data size to be transferred can be optimized, leading to low overhead. This approach also provides flexibility when migrating across heterogeneous environments. A second alternative, termed the TERN approach, is promising for cases when the program is compute intensive and asynchronous migration is essential. The last approach considered, Condor, provides high reliability in the form of checkpointing, but incurs a high migration delay and has high memory requirements for the network processors.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method of call processing in a communications network, said network including mobile stations adapted for wireless communication with nodes in a fixed portion of said network, said method comprising the steps of:

establishing at least one user agent, each user agent being operative to mimic signaling functions of an associated one of said mobile stations and being disposed at a signaling server operated at a node in said fixed portion of said network, said node being in wireless communications with said mimicked mobile station;

causing said user agent to interface with one or more other nodes in said network in behalf of said mimicked mobile station, for negotiation of signaling parameters in respect to a communications link to be established between said mobile station and said one or more other nodes; and upon movement of said mimicked mobile station from a first region, wherein wireless communication is maintained with a first signalling server having said user agent disposed thereat, to a second region wherein wireless communication is maintained with a second signaling server operated at another of said nodes in said fixed portion of said network, migrating said user agent to said second signaling server.

2. The method of claim 1, wherein said user agent maintains an operating profile and call state information pertaining to said mimicked mobile station.

3. The method of claim 1, wherein operating parameters of said user agent are preserved upon migrating said user agent to said second signaling server.

4. The method of claim 1, wherein a user process associated with said user agent is anchored at said user signaling server.

5. The method of claim 4, wherein said network includes one or more radio ports to enable wireless communication with said mobile station, further including the step of updating said radio ports with a location of said user agent as said mobile station associated with said user agent moves.

6. The method of claim 4, wherein said network includes one or more radio ports to enable wireless communication with said mobile station, wherein signaling links are established between said radio ports and a user signaling server in which said user agent is resident as said mobile station moves throughout said network.

7. The method of claim 1, wherein said network includes at least one location server for tracking the location of a mobile station within said network, said method further including the steps of:

generating a registration message from said mobile station to said location server upon movement from said first region to said second region, wherein said location server signals to said second user signaling server to migrate said user agent of said mobile station.

8. The method of claim 7, including the steps of requesting and receiving user agent profile parameters at said second user signaling server from said first user signaling server.

9. The method of claim 1, further including the step of maintaining a stub process at said first user signaling server to act in place of said user agent to buffer messages for said user agent during migration.

10. The method of claim 9, wherein said stub process exits after a predetermined idle time-out period.

11. The method of claim 9, wherein said user agent requests buffered information from said stub process once located at said second user signaling server, wherein normal processing by said agent is subsequently resumed.

12. The method of claim 2, wherein said user agent is updated about a current state of said mobile station and carries out call processing functions including call acceptance, call rejection call forwarding, mobile call termination status processing and compatibility checking of data transmissions.

13. The method of claim 2, wherein said user agent is a user process and said step of migrating further includes the steps of:

executing a new user process at said second user signaling server;

establishing a communications connection between a previous user process at said first user signaling server and said new user process;

transferring a data structure containing migration variables from said previous user process;

establishing communication channels at said new user process;

maintaining said previous user process as a stub process; and forwarding messages received during migration to said new user process.

14. The method of claim 13, wherein said data structure includes call connection data and current state data elements of said mobile station.

15. The method of claim 14, wherein said call connection data is selected from the group consisting of number of users, identification of users, call type, call forwarding and mobile call termination status.

16. The method of claim 14, wherein said current state data elements of said mobile terminal include compatibility checking procedures and applications being run at said mobile station.

17. The method of claim 1, wherein said user agent is a user process and said step of migrating further includes the steps of:

starting a new user process at said second user signaling server; and copying stack and data pages onto said second user signaling server, wherein said new user process may begin operation.

18. A method of call processing in a communications network, said network including mobile stations adapted for wireless communication, said method comprising the steps of:

registering a mobile station with said network, wherein an individual user agent is established in response to registration of said mobile station at a signaling server within said network, and wherein said user agent is associated with said mobile station and includes an operating profile thereof; and utilizing said user agent in conjunction with said operating profile to handle call processing functions at said signaling server on behalf of said mobile station to thereby reduce signaling loads over an air interface of said communications network and further including the step of migrating said user agent from a first user signaling server in a first region of said network to a second user signaling server in a second region of said network in response to a move by said mobile station from said first region to said second region, wherein said step of migrating includes, stopping and saving data register contents of a first user process on said first user signaling server at a source node;

transferring arguments and environment of said first user process to said second user signaling server;

creating a stub process to buffer incoming messages to said first user process;

executing a new user process on a target node at said second user signaling server with said arguments and environment obtained from said user signaling server of said source node;

calculating data and stack sizes of said first user process in migration at said first user signaling server of said source node;

transferring said data and stack sizes to said target user signaling server to thereby enable said new user process to expand its stack and data pages;

transferring and writing said data pages onto said new user process executing on said target user signaling server;

transferring and writing said stack pages;

establishing communication channels at said new user process;

sending a message from said new user process to said stub process and receiving outstanding messages that have been buffered; and transferring said register contents, wherein said new user process restarts from where it was interrupted.

19. A method of call processing in a communications network, said network including mobile stations adapted for wireless communication, said method comprising the steps of:

registering a mobile station with said network, wherein an individual user agent is established in response to registration of said mobile station at a signaling server within said network, and wherein said user agent is associated with said mobile station and includes an operating profile thereof; and utilizing said user agent in conjunction with said operating profile to handle call processing functions at said signaling server on behalf of said mobile station to thereby reduce signaling loads over an air interface of said communications network and further including the step of migrating said user agent from a first user signaling server in a first region of said network to a second user signaling server in a second region of said network in response to a move by said mobile station from said first region to said second region, wherein said step of migrating includes, sending a stop signal from a target user signaling server to said first user process;

creating a child stub process that buffers messages sent to said first user process;

executing a save register command from a target user process to save registers and a core dump in a buffer;

transferring data and stack pages from said core to said target user signaling server;

creating a new user process at said target user signaling server using a text segment from an executable present at an associated node, and with stack and data segments received from said first user signaling server;

establishing communication channels at said new user process;

sending a message from said new user process to said stub process and receiving outstanding messages that have been buffered; and executing a restore registers command at said new user process to enable continued execution from a point where said user process began migration.

20. A communications apparatus for use in a network including mobile stations adapted for wireless communication with nodes in a fixed portion of said network, said apparatus comprising:

means for establishing a user agent operative to mimic signaling functions of one of said mobile stations and disposed at a signaling server operated at a node in said fixed portion of said network, said node being in wireless communications with said one of said mobile stations;

means for providing an interface between said user agent and one or more other nodes in said network in behalf of said mimicked mobile station, for negotiation of signaling parameters in respect to a communications link to be established between said mobile station and said one or more other nodes; and means for effecting a migration of said user agent from a first signalling server in a first region to a target signaling server in a second region upon movement of said mimicked mobile station from said first region to said second region.

21. The apparatus of claim 20, wherein said user agent is anchored at a user signaling server, and wherein said network includes one or more radio ports to enable wireless communication with said mobile station, further including means for updating said radio ports with a location of said user agent as said mobile station associated with said user agent moves.

22. The apparatus of claim 20, wherein said user agent is anchored at a user signaling server, and wherein said network includes one or more radio ports to enable wireless communication with said mobile station, wherein signaling links are established between said radio ports and a user signaling server in which said user agent is resident as said mobile station moves throughout said network.

23. A communications network including mobile stations within said network, wherein each of said mobile stations is associated with a cluster within said network, said network comprising:

a plurality of clusters;

at least one user signaling server associated with each said cluster of said network, wherein said user signaling server includes, at least one user agent, said user agent being associated with an active individual mobile station, said user agent operable to mimic signaling functions of said associated mobile station and to negotiate, in behalf of said associated mobile station, signaling parameters in respect to a communications link to be established between said associated mobile station and one or more nodes in said communications network; and means for effecting a migration of said user agent from a first signalling server to a target signaling server in a different cluster upon movement of said associated mobile station to said different cluster.

24. The network of claim 23, wherein each said cluster further includes:

at least one connection server for establishing a communication path in said cluster over which user voice and data information are transmitted;

at least one call server for maintaining the network state of a call within said cluster; and further including at least one location server for tracking the location of a mobile station within said network.

25. The network of claim 24, wherein said mobile station is operable to generate a registration message to an associated location server upon changing clusters, wherein said location server signals to a target user signaling server to migrate said user agent associated with said mobile station, and wherein said target user signaling server is operable to request and receive relevant user agent parameters from a previous user signaling server.

26. The network of claim 23, wherein a previous user signaling server is operable to maintain a stub process in place of said user agent to buffer messages for said user agent during migration.

27. The network of claim 23, wherein said user agent operates a user process and said user process is operable to migrate by:

executing a new user process at a target user signaling server;

establishing a communications connection between a previous user process at a first user signaling server and said new user process;

transferring a data structure containing migration variables from said previous user process;

establishing communication channels at said new user process;

maintaining said previous user process as a stub process; and forwarding messages received during migration to said new user process.

28. The apparatus of claim 20, wherein said signalling functions further include call forwarding, mobile call termination status processing and compatibility checking of data transmissions.

29. The network of claim 23, wherein said signalling functions further include call forwarding and mobile call termination status processing.

* * * * *